May 8, 1945.　　　A. M. HOWALD ET AL　　　2,375,365
FABRICATION OF FIBROUS BODIES
Filed Feb. 14, 1939
Fig. I
Fig. II
Arthur M. Howald
Leonard S. Meyer
INVENTORS
BY Marshall & Marshall
ATTORNEYS Patented May 8, 1945

2,375,365

UNITED STATES PATENT OFFICE 2,375,365

FABRICATION OF FIBROUS BODIES

Arthur M. Howald and Leonard S. Meyer, Toledo, Ohio, assignors, by mesne assignments, to Libbey-Owens-Ford Glass Company, a corporation of Ohio Application February 14, 1939, Serial No. 256,328

4 Claims. (Cl. 154—40)

The invention relates to the fabrication of fibrous bodies containing formaldehyde-urea resin.

Among synthetic plastics, infusible resins are the most valuable, because they do not soften when warm and are highly resistant to water and organic solvents. Infusible resins in general can be formed only by the simultaneous application of heat and pressure. Thus in the manufacture of infusible resinous bodies, it is generally necessary to employ hot-pressing equipment, which is very cumbersome and expensive.

Formaldehyde-urea resin is one of the most useful infusible resins, because it is colorless and remarkably resistant to the action of light. Moreover, formaldehyde-urea resin is unique among infusible resins in that it can be produced without the application of heat, by gelling and hardening a solution of a formaldehyde-urea reaction product by means of a hardening catalyst. After a solid body has been formed by hardening a solution of a formaldehyde-urea reaction product, however, the body cracks and disintegrates in drying out. It is believed that the disintegration of a body formed by hardening such a solution is due to the colloidal nature of the solution. Evaporation of the solvent from the solution leaves a solid that is peculiarly lacking in structural strength and continuity.

The principal object of the invention is the fabrication of hardened, durable fibrous bodies from a solution of a formaldehyde-urea reaction product without necessitating the application of heat. More specific objects and advantages are apparent from the description, in which reference is had to the accompanying drawing illustrating bodies fabricated in accordance with the invention.

Fig. I of the drawing is a fragmentary section of a body containing feltable fibers.

Fig. II is a fragmentary section of a body in which the fibers are woven into plies of fabric.

This specific drawing and the specific description that follows merely disclose and illustrate the invention and are not intended to impose limitations upon the claims.

In accordance with the invention, a fibrous body is fabricated by forming a layer of feltable cellulosic fibers moistened with a solution of a formaldehyde-urea reaction product and a hardener therefor, the layer being thin enough to permit it to dry out appreciably during the hardening of the reaction product. It has been discovered that when the moistened fibers are formed into a layer, the resulting body does not crack and disintegrate like the bodies heretofore prepared by gelling and hardening solutions of formaldehyde-urea reaction products. If, instead of being formed into a layer, the moistened fibers were left in a receptacle and there permitted to gel into a hard mass, the resulting body would gradually crack and disintegrate in the usual manner while drying out. It is therefore believed that the failure of the resin to disintegrate in a fibrous body fabricated in accordance with the invention results from the fact that the material is in the form of a layer which dries out appreciably during the hardening of the reaction product.

The fibers that are used in carrying out the invention must be long enough to be feltable so that they may serve as reinforcement in the finished body. Moreover, cellulosic fibers must be used. The resin that is formed by hardening the formaldehyde-urea reaction product does not have satisfactory properties unless cellulose is present. It is not necessary that the fibers be of pure cellulose, but they must contain a substantial proportion of cellulose. For example, the term "feltable cellulosic fibers" is intended to include feltable asbestos fibers with which a substantial proportion of wood flour has been incorporated. The feltable fibers used in carrying out the invention may be in the form of loose fibers or linters, or they may be in the form of fabrics of various types.

Although the solution with which the fibers are moistened may be a solution of a formaldehyde-urea reaction product in any desired solvent such as an alcohol or an alcohol diluted by a hydrocarbon, the most economical solvent is water. The hardening catalyst may be dissolved in the solution before the fibers are moistened therewith, or it may be intermixed with the fibers, or applied in any other desired manner to cause it to dissolve after the fibers are moistened.

The hardeners that are useful with formaldehyde-urea reaction produces are acid substances such as acid salts, and various substances that liberate acids. Organic or inorganic acids may be used, but acid salts are preferred.

The quantity of hardening agent employed depends upon the speed of hardening desired, and the speed of hardening should be so coordinated with the speed of drying that appreciable drying occurs during the hardening. Thus when a sufficient proportion of hardener is used to cause hardening to take place in one hour, the material must be applied in a thinner layer than when the hardening requires 8 hours. The speed of drying, and consequently the permissible thickness of the layer, will vary with the relative humidity of the atmosphere and the porosity of the material. The ratios of resin to cellulose that can be employed will vary with the coarseness of the fibers or the texture of the fabric. If so much resin is employed in the composition that it cannot all be incorporated intimately with the cellulose, the portions of the resin that are not so incorporated may disintegrate. Unless the solution of the formaldehyde-urea reaction product is highly dilute, the fibers should be only moderately moistened or should be wrung out.

Fig. I shows a layer of feltable cellulosic fibers in the form of linters, cemented together by the formaldehyde-urea product. Although such a layer may be formed by simply spreading the moistened fibers on a supporting surface, it may also be applied by means of an apparatus that discharges a stream of the dry fibers, and an adjacent stream or spray of the solution to moisten the fibers as they are applied.

Fig. II shows a layer that is made up of superimposed plies of cellulosic fabric cemented together by means of the formaldehyde-urea product. If a heavy layer of this type is to be produced, only a few of the plies should be applied at a time so that they can be permitted to dry out before the succeeding plies are applied.

The hardened formaldehyde-urea resin renders the finished product water-resistant, durable and heat-resistant. Remarkable strength and elasticity result from the combination of the resin with the fibrous reinforcement. The proportion of resin employed may be as small as desired; it need only be great enough to give the desired rigidity and durability. If the moist layer is compressed before the formaldehylde-urea product has hardened, the structural strength of the product is enhanced. No application of heat is necessary. The compressing of the moist material does not harden the formaldehyde-urea product, but merely forms a more dense and solid body.

The present method of fabrication may be used for the production of durable sheets that are useful as structural material. By applying the material to suitable forms, finished articles of any desired shape may be made, such as an airplane wing or fuselage, a sound amplifier or a canoe. The moist composition may be used for calking and for a great variety of other purposes. The method is useful for the production of anatomical braces and supports, such as surgical casts. Casts produced in accordance with the invention provide excellent X-ray penetration, and are much less heavy and bulky than plaster casts of equivalent strength.

In the preparation of an aqueous solution of a formaldehyde-urea reaction product for use in carrying out the invention, it is preferable to carry the formaldehyde-urea reaction as far as it can be carried without precipitation. A suitable solution of a formaldehyde-urea reaction product may be prepared as follows: Urea and formaldehyde in a molar ratio of 1:2 are gently refluxed in an aqueous solution that has been brought to pH 4.5–5.0 by means of sodium hydroxide. After the refluxing has been continued long enough (about 1 hour) to carry the formaldehyde-urea reaction to the desired stage, the solution is neutralized and evaporated under a vacuum to the desired concentration.

To facilitate storage or shipment, the formaldehyde-urea product may be obtained in granular or powdered form by drum-drying or spray-drying the solution so prepared. If desired, the dry powder may be spread upon a cellulosic fabric, or mixed with feltable cellulosic fibers, and then moistened. However, it is preferable to redissolve the formaldehyde-urea reaction product so that the fibers can be moistened with the resulting solution. A solution used for moistening the fibers should be no more dilute than necessary for convenient application to the fibers, because a more dilute solution makes the material harder to dry.

*Example 1*

The method outlined above is used to prepare 410 grams of a 50 per cent solution of a formaldehyde-urea reaction product. After the addition of 7 grams of ammonium chloride as a hardener, the solution is used to impregnate 140 grams of cotton cloth in the form of strips 2 inches wide. The strips are then used to form a surgical cast. The dried and hardened cast weighs about 350 grams, and therefore contains about 60 per cent resin.

*Example 2*

After the preparation of 44 grams of a 40 per cent solution of a formaldehyde-urea reaction product and the addition of 1 gram of ammonium chloride, the solution is used to impregnate 55 grams of cotton fabric strips. The strips are used to make a surgical cast, which weighs 92 grams when hard and dry, and therefore contains 40 per cent resin. The casts prepared in accordance with Examples 1 and 2 are very hard, dense and strong.

*Example 3*

After the preparation of 56 parts of a 60 per cent solution of a formaldehyde-urea reaction product and the addition of 5 parts ammonium chloride, 46 parts of burlap are immersed in the solution and then passed through a roll wringer. Several layers of the burlap are then pressed between steel plates to form a sheet ⅛ inch thick. The resulting sheet contains 42 per cent resin when dry, and is strong and elastic.

*Example 4*

300 parts of a 50 per cent solution of a formaldehyde-urea reaction product, 30 parts of ammonium chloride, and 100 parts of cotton linters are mixed to produce a wet mass. The resulting material can be used as a calking compound, or it can be spread in a sheet and pressed between steel plates to form a hard board that contains 60 per cent resin when dry.

*Example 5*

100 parts of a 50 per cent solution of a formaldehyde-urea reaction product and 5 parts of ammonium chloride are stirred to form a clear solution. Strips of muslin are then sprayed with the solution and are laid on a form in the shape of a sound amplifier. The dried article has a resin content of about 55 per cent.

Various embodiments of the invention may be devised to meet various requirements.

Having described our invention, we claim:

1. A method of fabricating a resinous body of great compressive strength that comprises impregnating a cellulosic fabric with a solution of a formaldehyde-urea reaction product in a solvent selected from the class consisting of water and alcohols, and an acidifying agent for hardening the reaction product, supporting a plurality of layers of the impregnated fabric in the form of a body of the desired shape, to hold the shape of the body prior to the hardening of the reaction product, and drying the body appreciably during the hardening of the reaction product, the body when dry containing up to about 60 per cent of the hardened reaction product.

2. A method of fabricating a resinous body of great compressive strength that comprises separately applying, to a cellulosic fabric, an aqueous solution of a formaldehyde-urea reaction product, and a water-soluble acidifying agent for hardening the reaction product, to produce an impregnated fabric, supporting a plurality of layers of the impregnated fabric in the form of a body of the desired shape, to hold the shape of the body prior to the hardening of the reaction product, and drying the body appreciably during the hardening of the reaction product, the body when dry containing up to about 60 per cent of the hardened reaction product.

3. A method of fabricating a resinous body of great compressive strength that comprises preparing an aqueous solution of both a formaldehyde-urea reaction product and an acidifying agent for hardening the reaction product, impregnating a cellulosic fabric with the solution, supporting a plurality of layers of the impregnated fabric in the form of a body of the desired shape, to hold the shape of the body prior to the hardening of the reaction product, and drying the body appreciably during the hardening of the reaction product, the body when dry containing up to about 60 per cent of the hardened reaction product.

4. A method of fabricating a resinous body of great compressive strength that comprises impregnating a cellulosic fabric with an aqueous solution of a formaldehyde-urea reaction product, and an acidifying agent for hardening the reaction product, then applying a plurality of layers of the impregnated fabric, in the form of a body of the desired shape, upon a support for holding the shape of the body prior to the hardening of the reaction product, and drying the body appreciably during the hardening of the reaction product, the body when dry containing from about 40 to about 60 per cent of the hardened reaction product.

ARTHUR M. HOWALD.
LEONARD S. MEYER.